United States Patent [19]

Escaravage et al.

[11] Patent Number: 5,053,604

[45] Date of Patent: Oct. 1, 1991

[54] PROCESS AND DEVICE FOR CONTROL OF ELECTRICAL RESISTORS, PARTICULARLY FOR AN INDUSTRIAL FURNACE

[75] Inventors: Bruno Escaravage, Entraigues sur Sorgues; Jean-Luc Lesage, Compiegne; Francois Mehl, Lewarde-Quesnain, all of France

[73] Assignee: Saint Gobain Vitrage, Courbevoie, France

[21] Appl. No.: 251,785

[22] Filed: Oct. 3, 1988

[30] Foreign Application Priority Data

Oct. 2, 1987 [FR] France .............................. 87 13626

[51] Int. Cl.⁵ ............................................. H05B 1/02
[52] U.S. Cl. .................................. 219/483; 219/485; 219/486; 219/501; 219/506; 307/41; 307/38; 65/162
[58] Field of Search ................. 65/106, 162, 163, 111; 219/494, 506, 497, 499, 501, 505, 483–486, 507–509; 307/38–41

[56] References Cited

U.S. PATENT DOCUMENTS

| | | | |
|---|---|---|---|
| 4,010,412 | 3/1977 | Forman | 219/486 |
| 4,153,936 | 9/1978 | Schmitz et al. | 65/162 |
| 4,256,951 | 3/1981 | Payne et al. | 219/486 |
| 4,340,807 | 7/1982 | Raskin et al. | 219/497 |
| 4,348,582 | 9/1982 | Budek | 219/483 |
| 4,377,739 | 3/1983 | Eckert, Jr. et al. | 219/492 |
| 4,511,791 | 4/1985 | Desai et al. | 65/162 |
| 4,601,743 | 7/1986 | Canfield | 65/162 |
| 4,807,144 | 2/1989 | Joehlin et al. | 65/162 |
| 4,824,464 | 4/1989 | Perin et al. | 65/106 |

Primary Examiner—Mark H. Paschall
Attorney, Agent, or Firm—Oblon, Spivak, McClelland, Maier & Neustadt

[57] ABSTRACT

A process and device for controlling heating of a furnace by means of electrical resistors using switching devices, particularly thyristors, associated with the electrical resistors, and whose operation is to be controlled. The switching devices are controlled in syncopated mode by an industrial computer, a programmable industrial robot or equivalent which performs a set of functions which make it possible to compute the power to be dissipated in the resistors, and control directly the switching devices so as to dissipate the previously coputed power. The invention applies particularly to controlling industrial furnaces and more particularly of glassmaking furnaces, particularly furnaces for heating of glass for the tempering and/or bending of the glass.

23 Claims, 7 Drawing Sheets

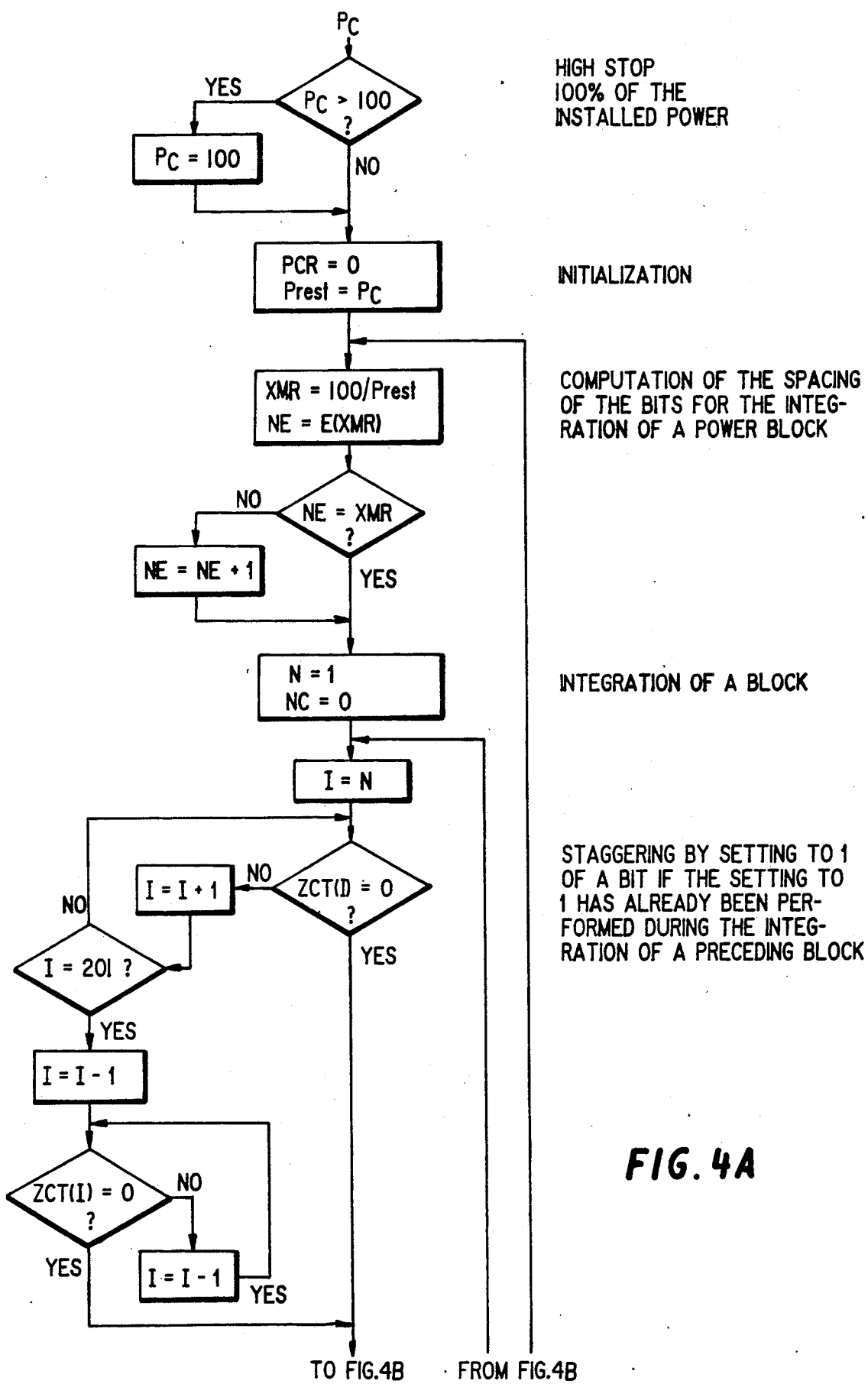

PROCESS AND DEVICE FOR CONTROL OF ELECTRICAL RESISTORS, PARTICULARLY FOR AN INDUSTRIAL FURNACE

BACKGROUND OF THE INVENTION

1. Field of the Invention

This invention relates to processes and devices for heating by utilizing of electrical resistors and more particularly to processes and devices for controlling the power supplied to industrial electrical furnaces, particularly in the glassmaking industry, for example, furnaces for heating of glass for the tempering and/or bending of the glass.

2. Discussion of the Background

It is important that the power supplied to the electrical resistors, particularly of a furnace, for example, intended for heating glass sheets for their tempering and/or their bending, be strictly controlled, otherwise the various glass sheets will be treated differently and will be bent and/or will be tempered differently from one another. This will result in disparities in the shapes of the glazings thus produced, as well as in their tempering state.

For these tempering and/or bending furnaces of glass sheets in particular, a great precision in the electric power dissipated is needed and it is desired in particular to have only variations of less than 1%.

Besides the advantages to be derived with respect to tempering and/or bending of the glass already mentioned, the precise control of the power dissipated would make it possible to avoid the effect of disturbances of the general electric power network and/or avoid other disturbances, and to cause the installations to operate with more regularity, which is beneficial for their service life.

Of course, there are similar controls of thyristors which could be satisfactory to control industrial electrical furnaces, but in these cases, there are then associated with each thyristor one or more electronic control and conversion circuit cards whose cost are high. When it is considered that for large installations, it is necessary to control a hundred or more thyristors, the cost that this type of installation would represent becomes clear.

SUMMARY OF THE INVENTION

Accordingly, one object of this invention is to provide a novel process and device which solves the above-noted problem of the precise control of the power dissipated in resistors, for example, in an electric furnace, particularly intended for heating of glass sheets for their tempering and/or their bending, without it being necessary to invest great sums as is otherwise necessary according to the prior art.

The above object and others were achieved by providing a new and improved process using thyristors associated with electrical resistors whose operation is to be controlled, which controls the dissipated power in a syncopated mode by any system using a digital technology, for example a computer of the industrial type, a programmable industrial robot (PIR) or a microprocessor performing a set of functions which makes it possible to compute the powers to be dissipated on the one hand, and to control directly the electrical switching systems, particularly the relays or the thyristors so as to dissipate the previously computed powers, on the other hand.

The steps performed include:
computations of the power levels to be dissipated;
computation of the syncopated sequences and/or selection of the syncopated sequences corresponding to the level of power to be dissipated;
formulation of a control matrix or table for all the switching systems, for example of the thyristors type; and
logic control of the switching systems.

Advantageously, to improve the precision of the control of the dissipated power, an additional step of controlling the potential difference (PD) of the network supplying the electricity and of correction of the theoretical power to be dissipated as a function of the fluctuations in this PD is performed.

Preferably, a smoothing of the control matrix or table of all the switching systems is also performed, so as to prevent a simultaneous starting of all these systems assigned adjacent percentages of corrected power. Advantageously, to reduce computation times, this smoothing is performed by a simple staggering of the sequences of the control matrix or table of the switching systems. Advantageously, these steps are performed based on a computation algorithm introduced into the computer, the robot or the like.

The present invention is also directed to a device including electrical resistors, for use, in particular in a furnace in the heating of glass sheets, particularly for their bending and/or their tempering, these resistors being controlled by electric switching systems, particularly by thyristors, and switching systems directly connected to a digital technology system particularly a computer, for example an industrial computer, a programmable industrial robot (PIR), a microprocessor, without interposition of control and conversion units of the electronic cards type, the computing and control functions of these switching systems associated with resistors being performed by the computer or the robot or the microprocessor and in general by the digital technology system.

Advantageously, this computer, this robot or this microprocessor already belongs to the furnace installation, to regulate its operation and it is simply required of it to accomplish functions in addition to those that it already performs, to control the operation of the switching systems, particularly of the thyristors and associated resistors.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 6:
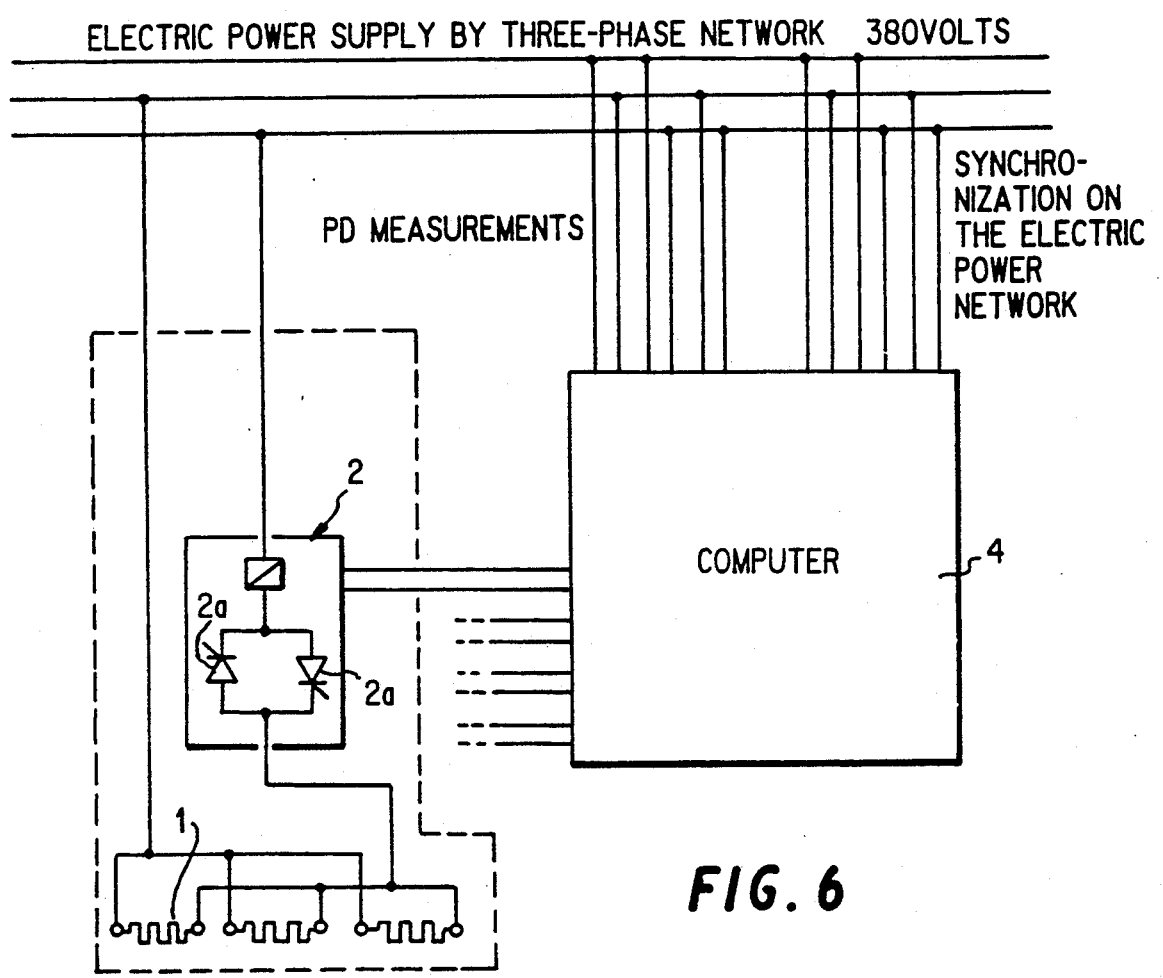
FIG. 6 is a block diagram of an installation equipped with resistors and controlled by computer, robot or microprocessor.

Referring now to the drawings, wherein like reference numerals designate identical or corresponding parts throughout the several views, FIG. 6 shows an installation equipped with resistors such as 1 to be controlled. These resistors 1 are associated with electric switching systems 2, for example control thyristors 2a, connected directly by cables 3 to an industrial computer, 4, which can be a programmable industrial robot or a microprocessor, for example, the computations and the control functions necessary for controlling these resistors and switching systems such as thyristors being formulated in this computer 4 or the like and transmitted directly to the switching systems without interposition of electronic control and conversion cards.

The functions which in the prior art could be accomplished at the level of the electronic cards are transferred to the computer.

Thus, the logic control in a syncopated mode of each thyristor is formulated in the computer 4.

Thus, to control the thyristors 2a, a plurality P of logic controls (0 or 1) or a syncopated sequence should be applied to the thyristors 2a for P alternations of 20 milliseconds of an electric power network of 50 Hz, which corresponds to the power which must theoretically be dissipated in the resistors 1 of the installation.

The number P depends on the precision desired. Thus, for a desired power quantization error less than 0.25%, it is necessary to control 200 alternations per sequence, i.e., the time base of the system is 4 seconds.

The computer 4 prepares the syncopated sequence pertaining to each thyristor 2a. Advantageously, to optimize the computation time of the computer 4, the computer 4 stores in its memory the 201 preformulated syncopated sequences (from 0 to 100% per step of 0.5%) and causes to be selected only the syncopated sequences for each thyristor.

The computation or the selection of the syncopated sequences is performed so that the power dissipated in all the resistors 1 controlled by the thyristors 2a is constant overall from second to second. From that, the computer formulates a control table of all the thyristors connected to the same phase of the network delivering electricity (table with P columns and with as many lines as there are thyristors to control, consisting of 1 or 0 depending on whether the thyristor must be conductive or nonconductive).

Then, from this control table, the computer 4, at each alternation of the electric power network, selects a column from its control table that it validates on the control of the thyristors. This operation requires a synchronization of the computer or the like on the network, to validate an effective conduction of each thyristor, if necessary.

Figure 1:
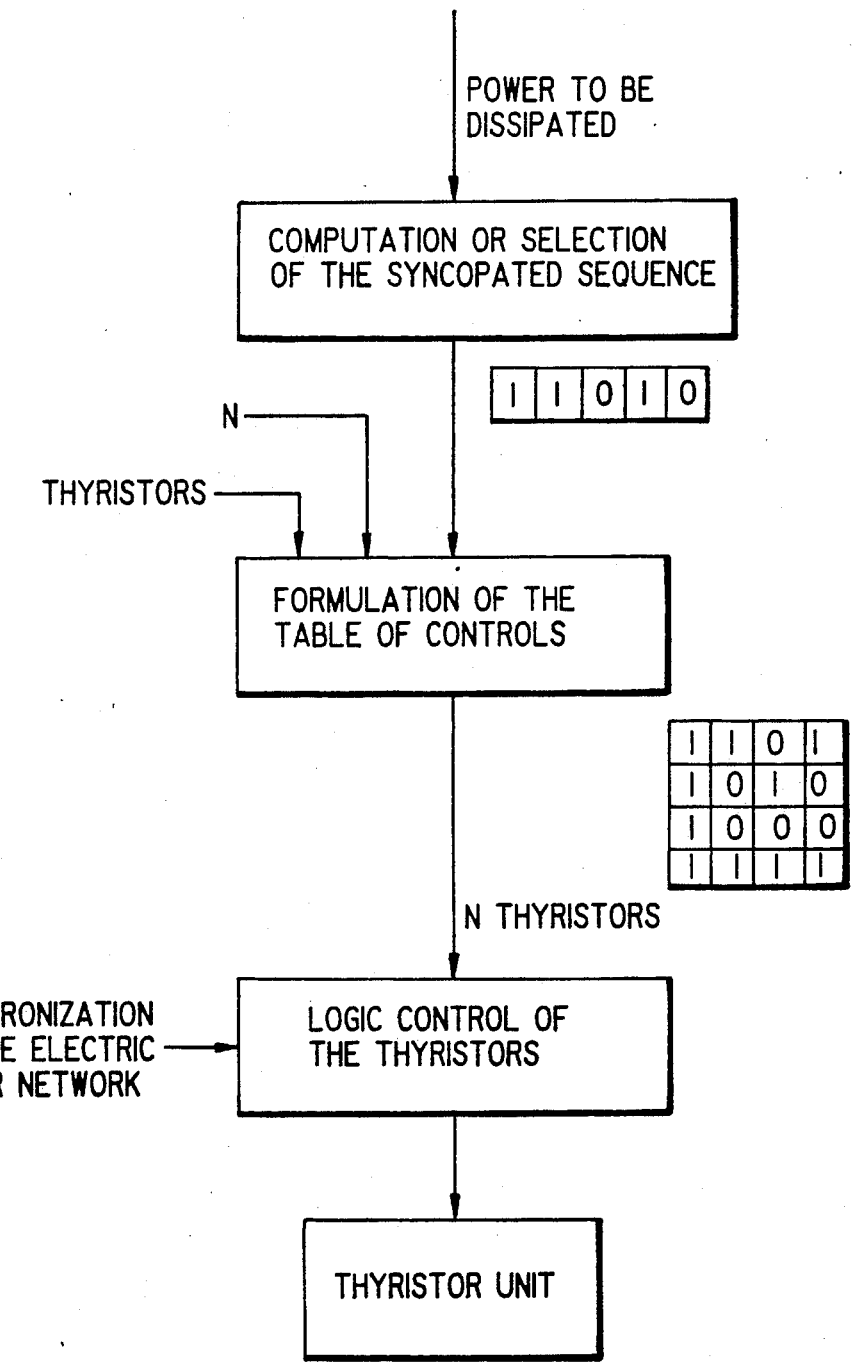
FIG. 1 is a block diagram schematically illustrating the functions performed by an industrial computer, a programmable industrial robot or a microprocessor to control the electric power dissipated in the resistors of a furnace.
Figure 2:
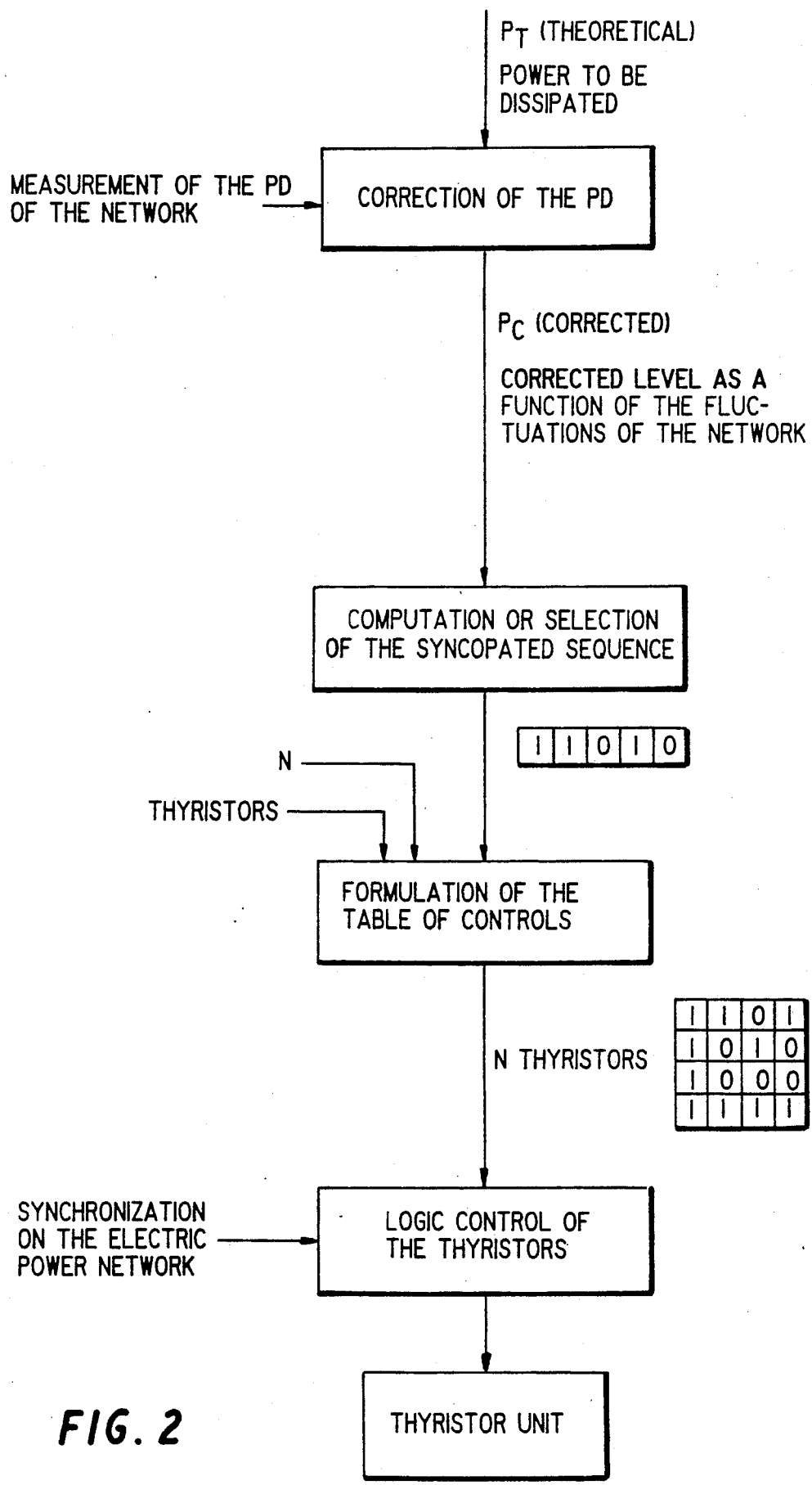
FIG. 2 is a block diagram similar to that of FIG. 1, but showing an improved operation.

This type of control is diagrammed in FIG. 1. Advantageously, as FIG. 2 illustrates, the possible disturbances of the electric power network are taken into account and a correction of the theoretical power to be dissipated is made to eliminate these disturbances. The corrected value $P_C$ of the power, as a function of the fluctuations of the electric power network, is:

$$P_C = P_T \frac{U_N^2}{U_M^2}$$

$P_T$ being the theoretical power to be dissipated (nominal level of the potential difference PD of the network), $U_N$ being the nominal value of the potential difference PD of the network, $U_M$ being the measured value of the potential difference PD of the network, $P_T$ and $P_C$ being expressed in percentages of the installed power.

The correction of potential difference is made once per phase and, consequently, simultaneously for all the thyristors connected to this same phase. Compared with a method where the correction would be made at the level of the thyristor and, therefore, once per thyristor and as many times as there are thyristors, this method makes a substantial savings possible.

Therefore, it is on the basis of this power corrected as a function of the fluctuations of the electric power network that the syncopated sequences pertaining to each thyristor are computed or selected from preselections entered in memory in the computer or PIR, then that table controlling the thyristors is formulated and that finally the thyristors are controlled. As before, these computing and control functions are performed by the computer or PIR or the like.

Further, according to a preferred mode, to compensate for the effect of simultaneous starting of the thyristors assigned adjacent percentages of corrected power, a smoothing of the control table is performed. Advantageously, and considering the advantage that there is in reducing as much as possible the cyclic computation times of the computer or the like, each sequence of the table undergoes a staggering by one step number equal to the position of its line minus one.

Figure 3:
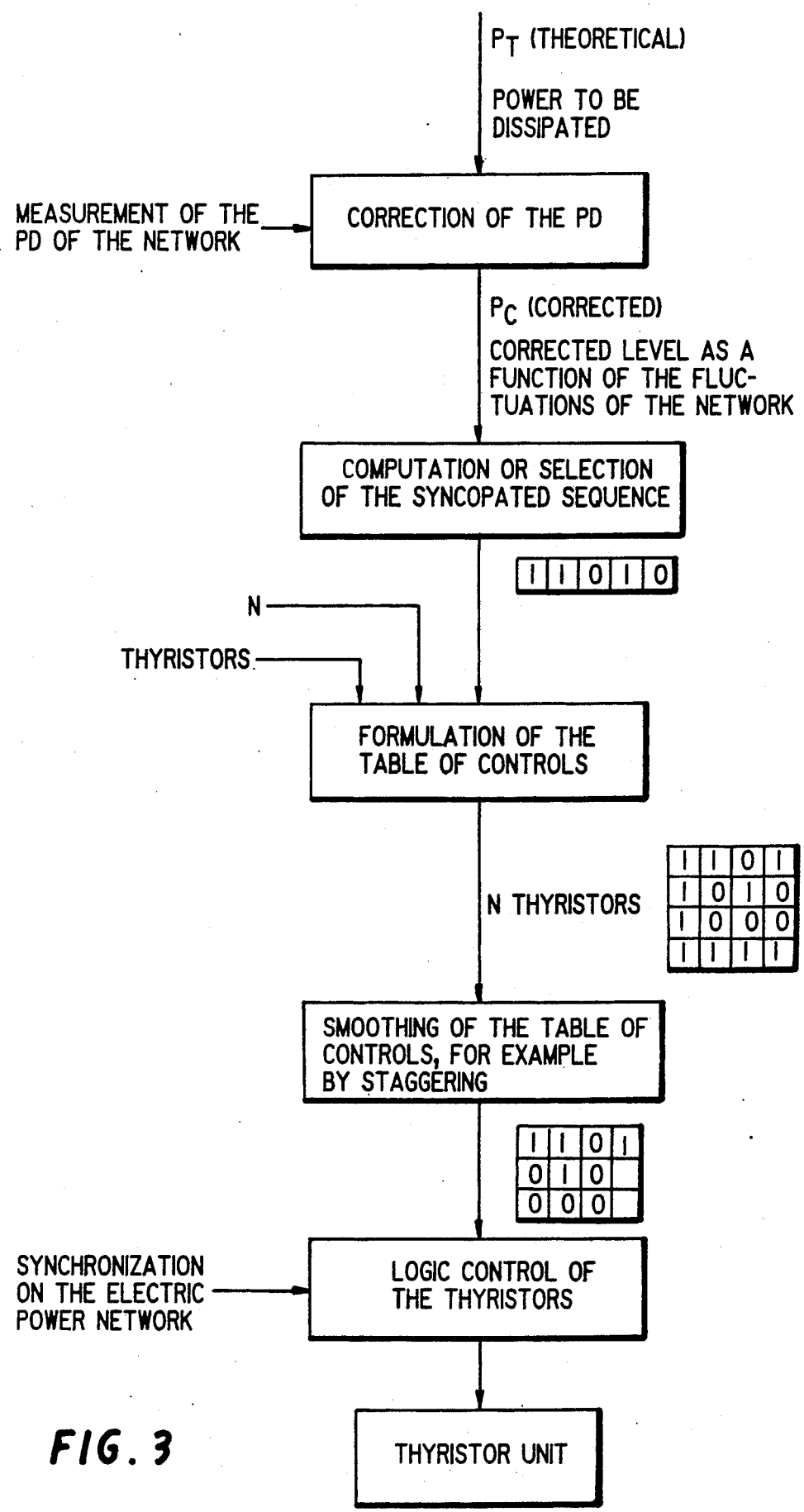
FIG. 3 is a block diagram similar to those of FIGS. 1 and 2 but schematically illustrating a preferred mode of control.
Figure 4B:
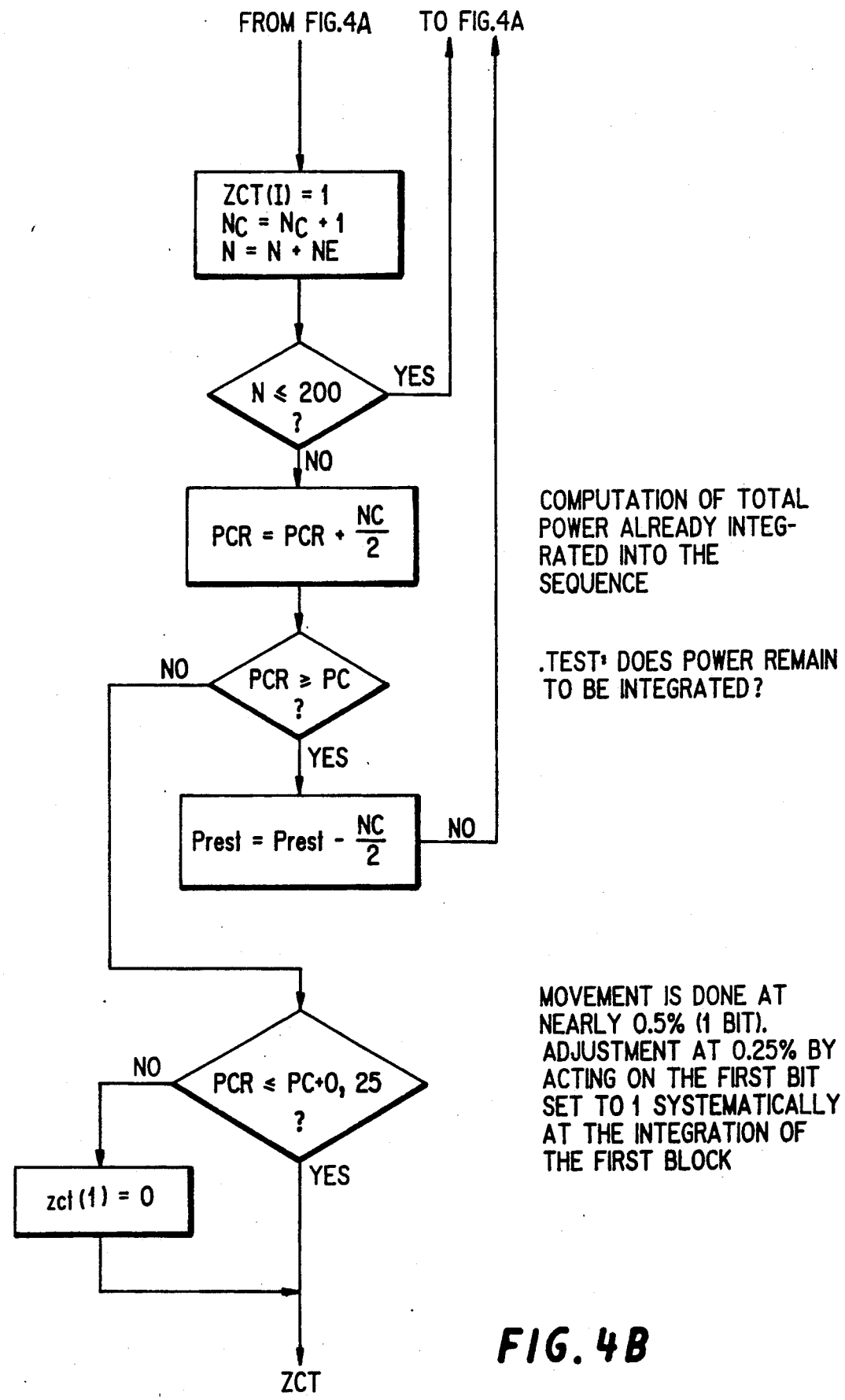
FIG. 4 is a flow chart illustrating an algorithm for creating a syncopated sequence corresponding to a given percentage of power: $P_C$.

These computing operations for preparation of syncopated control can be performed manually, but preferably and advantageously they are performed by the computer or the like, thanks to a computations algorithm introduced in the computer or the like. Such an algorithm for using the preferred mode of FIG. 3 is represented in FIG. 4. Another algorithm represented in FIG. 5A can also be used.

In FIG. 4, various variables having particular meanings, as next summarized, are used:

| VARIABLE ZCT (200) | TYPE TABLE OF BITS | MEANING Syncopated Sequence |
|---|---|---|
| $P_T$ | Real | % Of theoretical power to be dissipated |
| $P_C$ | Real | % Of corrected power as a function of the fluctuations of the network |
| PCR | Real | % Of power already integrated into the sequence during computation |
| Prest | Real | % Of power remaining to be integrated into the sequence during computation |
| XNR | Real | Theoretical spacing of the bits for the integration of the power block remaining to be integrated into the sequence |
| NE | Whole | 1st Whole greater than or equal to XNR. Actual |

-continued

| VARIABLE ZCT (200) | TYPE TABLE OF BITS | MEANING Syncopated Sequence |
|---|---|---|
|  |  | spacing of the bits during the integration of power block in the sequence |
| NC | Whole | Number of bits set to 1 during the integration of a block |
| I | Whole | Sequence indicator varying from 1 to 200 representing the position of the bit in the sequence |

Figure 5:
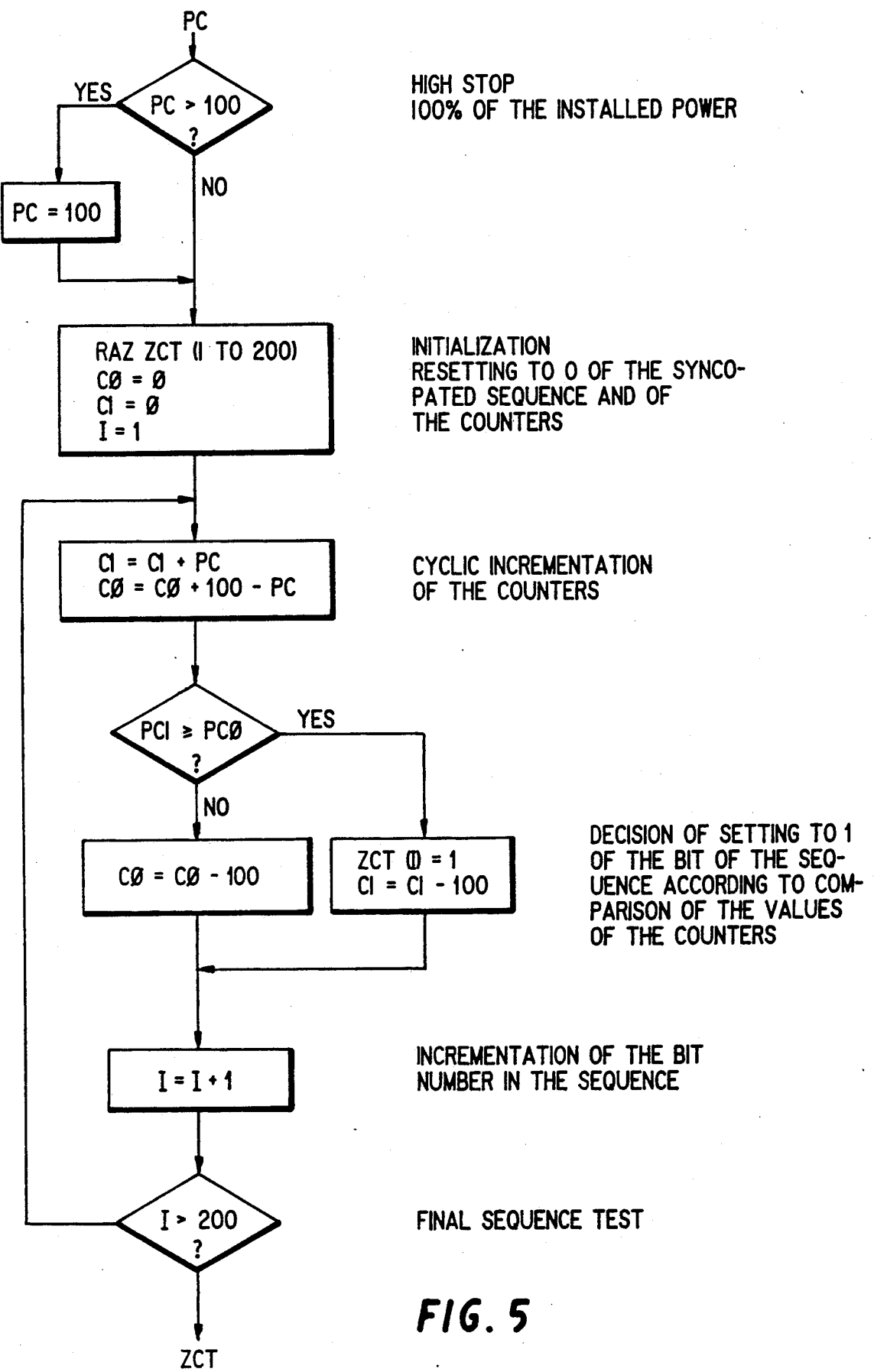
FIG. 5 is a flow chart illustrating another algorithm for creating a syncopated sequence using the method of deficits.

Similarly, FIG. 5 used different variables having the following meanings:

| VARIABLE ZCT (200) | TYPE Table of Bits | MEANING Syncopated Sequence |
|---|---|---|
| PC | Real | % Of power to be dissipated |
| CO | Whole | Counter of the 0's used in the method of deficits |
| $C_1$ | Whole | Counter of the 1's used in the method of deficits |
| I | Whole | Sequence indicator varying from 1 to 200 representing the position of the bit in the sequence |

As a variation, in particular when the syncopated sequences are preformulated, a presmoothing of the reference table of the syncopated sequences, performed itself by staggering of the sequences is proposed.

As already noted, when the computing and control functions of the thyristors are made to be performed in a computer, which can be a PIR or a microprocessor, present in any case on the installation, the cost of the equipment is much lower. The power actually dissipated can easily be controlled and, therefore, disturbances of the electric power network can be more precisely taken into account and the desired power can be dissipated more homogeneously.

Computing of the powers to be dissipated is performed in the computer 4, preferably according to a regulation objective. A regulation objective often used consists in controlling the environmental temperatures of the furnace, but other regulation objectives can be envisaged. In one embodiment, the measurements of temperatures are taken by thermocouples; the set points are introduced via a screen-keyboard to the computer 4.

The present invention also employs regulation algorithms, for example of the proportional-plus-integral-plus-derivative type, to compute the powers to be dissipated as a function of the change in the measurement in relation to the set point.

The method of the present invention is completely suitable to any algorithm whatsoever for regulating or computing powers to be dissipated. In addition, as already mentioned, this method offers the possibility of controlling several and even a very large number of thyristor units by the same computer, whereas before a similar module was necessary per thyristor unit.

In light of the above description, it is further noted that the present invention increases the service life of the equipment under regular conditions, and promotes a better constancy of operation, hence improved efficiencies and improved qualities of glazings (more precise conditions for heating glazings, leading to better temperings and/or bendings). A decrease in electrical disturbances generated by the installation also results, hence less pollution of the general electric power network. Thanks to the fact that the method is entirely digital, without any transmission of information in an analog manner and without any analog/digital type conversion, the precision obtained is very great.

The above description has been made almost exclusively by referring to thyristor switching systems, but the technique described above can be extended to any electric switching system among which, of course, are thyristors, but for example may also be mechanical or statistical relays.

Likewise, the use of a computer or PIR has been described, but a generalization to any system using a digital technology should be made. By way of nonlimiting example, these systems include, in particular, computers, for example of industrial type, programmable industrial robots, microprocessors.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A process for controlling the power dissipated in electrical resistors used in a furnace for heating glass sheets for tempering and/or bending of the glass sheets, comprising:
    controlling the power to be dissipated in each resistor by means of switching devices connected to respective of said resistors; and
    controlling the switching devices in a syncopated mode by means of a digital computer, including performing predetermined computing functions to define the power to be dissipated in said resistors, and controlling directly the switching devices so as to apply to said resistors an amount of power so that the previously defined power is dissipated by said resistors.

2. Process according to claim 1, wherein said step of controlling by means of said digital computer comprises:
    computing the power to be dissipated by locating a plurality of temperature measuring devices in the enclosure of the furnace, measuring the temperature of the furnace by means of the said temperature measuring devices, and computing the power to be dissipated as a function of the measured temperatures in order to regulate the temperatures registered in the furnace by means of the power dissipated by said resistors.

3. Process according to claim 1, comprising:
    determining correction values for the power to be applied to the resistors from a power network by determining any variations of the potential of the power network with respect to a predetermined potential; and
    controlling the power applied to the resistors in accordance with the computed correction values.

4. Process according to claim 1, wherein the computing functions performed by said digital computer comprise:

computing a set of syncopated control values to be applied to said plural switching devices.

5. Process according to claim 4, wherein the control functions performed by said digital computer comprise:
   selecting a syncopated sequence of control signals to be applied to said switching devices;
   forming a control table for all the switching devices based on the syncopated sequences selected in said selecting step;
   combining the control values from said control table in predetermined logical combinations to produce control signals applied to respective ones of said switching devices to control the switching of said switching devices.

6. Process according to claim 5, wherein the control functions performed by said digital computer comprise:
   smoothing the control table.

7. Process according to claim 6, wherein the syncopated sequences are preformulated and the smoothing of the control table is preestablished.

8. Process according to claim 6, wherein said smoothing step is performed by staggering said control table.

9. Process according to claim 7, wherein said smoothing step is performed by staggering said control table.

10. Process according to claim 1, wherein said step of controlling by means of said digital computer is performed by means of software provided in a computer.

11. Process according to claim 2, wherein said control functions performed by said computer comprise:
    computing the power to be dissipated as a function of a change in measured temperature of the furnace using a proportional-plus-integral-plus-derivative algorithm.

12. Process according to claim 1, comprising:
    using said computer device to control at least one process variable of said furnace in addition to controlling of said switching devices.

13. Process according to claim 1, wherein said controlling the switching devices comprises:
    computing the power levels to be dissipated;
    computing the syncopated sequences and/or selection of the syncopated sequences corresponding to the level of power to be dissipated;
    forming a control matrix or table for all the switching devices; and
    performing logic control of the switching devices.

14. Process according to claim 1, wherein said step of controlling by means of said digital computer is performed by means of software provided in a robot.

15. A device for controlling the power dissipated in electrical resistors used in a furnace for heating glass sheets for tempering and/or bending of the glass sheets, comprising:
    plural switching devices connected between a power network and the resistors for applying the power to be dissipated in each resistor; and
    means for controlling the switching devices in a syncopated mode, including a digital computer which performs predetermined computing functions to define the power to be dissipated in said resistors and to control directly the switching devices so as to apply to said resistors an amount of power so that the previously computed power is dissipated by said resistors.

16. Device according to claim 15, comprising:
    means for determining correction values for the power to be applied to the resistors from a power network by determining any variations of the potential of the power network with respect to a predetermined potential; and
    means for controlling the power applied to the resistors in accordance with the computed correction values.

17. Device according to claim 15, wherein said digital computer comprises:
    means for computing a set of syncopated control values to be applied to said plural switching devices.

18. Device according to claim 17, wherein said digital computer comprises:
    means for selecting a syncopated sequence of control signals to be applied to said switching devices;
    means for forming a control table for all the switching devices based on the syncopated sequences selected in said selecting step; and
    means for combining the control values from said control table in predetermined logical combinations to produce control signals applied to respective ones of said switching devices to control the switching of said switching devices.

19. Device according to claim 18, wherein said digital computer comprises:
    means for smoothing the control table.

20. Device according to claim 19, wherein said digital computer comprises:
    memory means for storing preformulated syncopated sequences and a preestablished smoothed control table.

21. Device according to claim 19, wherein said smoothing means comprises:
    means for staggering said control table.

22. Device according to claim 15, comprising:
    means for measuring the temperature of said furnace at predetermined locations in said furnace; and
    means for computing the power to be dissipated as a function of a change in measured temperature of the furnace using a proportional-plus-integral-plus-derivative algorithm.

23. Device according to claim 15, wherein said computer comprises:
    means for computing the power levels to be dissipated;
    means for computing the syncopated sequences and/or selection of the syncopated sequences corresponding to the level of power to be dissipated;
    means for forming a control matrix or table for all the switching devices; and
    means for performing logic control of the switching devices.

* * * * *